UNITED STATES PATENT OFFICE.

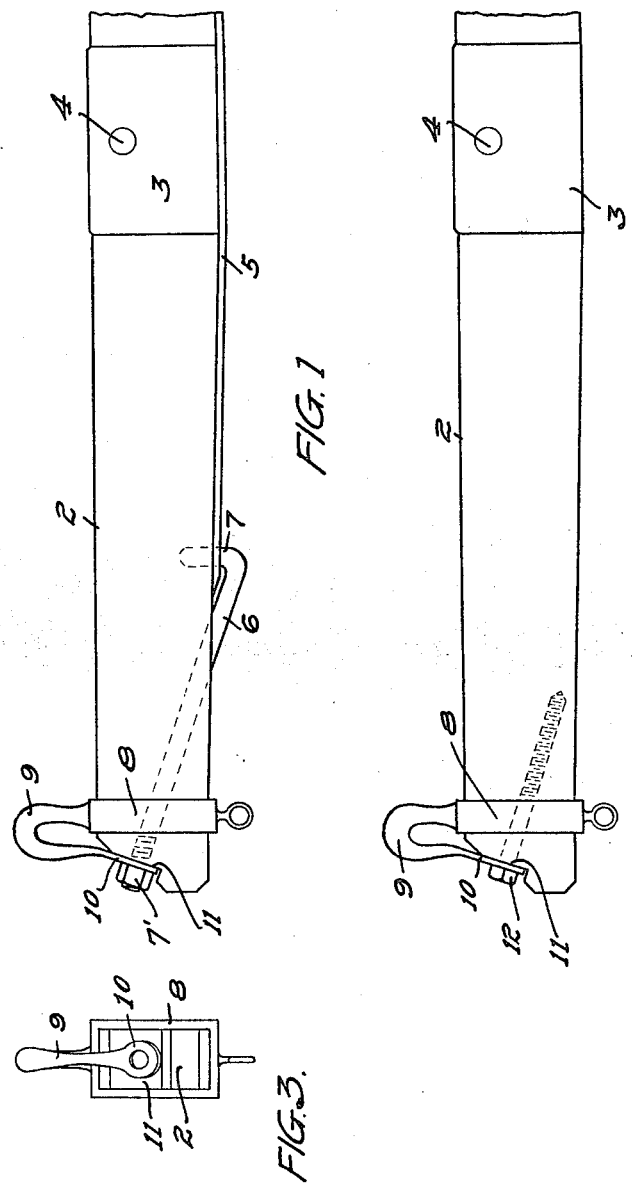

WILLIAM H. CROSSLEY, OF LEWISTON, IDAHO.

DOUBLETREE.

1,106,549.   Specification of Letters Patent.   Patented Aug. 11, 1914.

Application filed April 28, 1913. Serial No. 764,102.

*To all whom it may concern:*

Be it known that I, WILLIAM H. CROSSLEY, a citizen of the United States, resident of Lewiston, in the county of Nez Perce, State of Idaho, have invented certain new and useful Improvements in Doubletrees, of which the following is a specification.

The object of my invention is to provide a doubletree of extremely strong and durable construction and one in which the strain will be more evenly distributed than usual in devices of this kind.

A further object is to provide a doubletree of such construction that soft wood at a comparatively low price can be utilized for the doubletree with perfect safety.

A further object is to provide a doubletree of such construction that a swingletree or chains can be easily and quickly attached to or detached therefrom.

My invention consists generally in a truss construction of doubletree in which the pull on the clevis will be evenly distributed throughout the length of the doubletree bar.

In the accompanying drawings forming part of this specification, Figure 1 is a plan view of a portion of a doubletree embodying my invention, Fig. 2 is a similar view illustrating a modified construction, Fig. 3 is an end view of the construction shown in Fig. 1.

In the drawing, 2 represents a wooden bar of suitable length for the doubletree, and provided with a centrally arranged box 3 having the usual socket 4 for a pivot pin. I have shown one end of the doubletree and the middle portion thereof, and it will be understood that the opposite end of the bar is equipped with a clevis and truss construction similar to that shown in the drawing. I have not thought it necessary, therefore, to illustrate the full length of the doubletree.

On the back of the bar 2 is provided a metallic strap 5 extending along the rear edge of the bar and forming a brace or backing therefor, and at the end of the strap I provide a hook 6 having an inwardly turned end 7 which passes through a hole in the strap 5 and into the bar 2, while the shank of the hook fits within a diagonal socket in the end of the bar and is provided with a threaded end and a lock nut 7'. A clevis 8 fits over the end of the bar and is provided with a hook 9, the end of which is preferably flattened at 10 and has a hole therein to receive the end of the shank 6. The end of the bar 2 has a flattened face 11 against which the part 10 of the hook 9 is clamped by the pressure of the lock nut 7' thereon. When the pulling strain is applied to the hook 9 through the attachment of the swingletree or chain thereon, it will be transmitted through the hook 9 to the strap 5, and distributed lengthwise of the doubletree, said hook and strap forming a truss-like construction and distributing the pull on the doubletree evenly and relieving to a very large extent the strain which usually falls upon the clevis and the end portions of the doubletree as ordinarily constructed. The end of the hook 9 being securely bolted, will be much stronger than as ordinarily formed.

In Fig. 2 I have shown a modified construction which consists in providing a lag screw 12 adapted to be inserted through the end of the hook 9 into the end portion of the doubletree bar. This will have the effect of securely holding the end of the hook and transmitting the strain thereon into the bar rather than having it entirely sustained by the clevis.

This device can be used upon any size of evener or doubletree and with a few slight modifications in the central box can be readily adapted for swingletrees or neck-yokes. This invention may also be readily adapted for the evener or doubletree of a buggy, in which the swingletree is usually mounted on a coupling on the top of the evener instead of being connected by a hook with the evener, as shown in the drawings, for farm or other heavy work. This adaptation of the invention to a buggy style of evener would be obvious to any one skilled in the art and I have not thought it necessary to illustrate it herein.

I claim as my invention:—

1. The combination, with a bar, of a clevis encircling the end of said bar and having a hook provided with a backwardly extending portion and a securing means passing through said backwardly extending portion and diagonally through the end of said bar and anchored therein.

2. The combination, with a bar, of a clevis having a socket therein to receive the end of said bar and provided with a hook having a backwardly extending portion and a bolt passing through said backwardly extending portion and diagonally through the end of said bar and having its inner end inwardly turned and anchored in the rear edge of said bar.

3. A doubletree comprising a bar, a metallic strap extending lengthwise of said bar on the rear edge thereof, a clevis mounted on the end of said bar and provided with a hook, a bolt passing through the end portion of said hook and through said bar and having its inner end engaging said strap and forming therewith a truss construction for bracing and supporting said bar.

4. The combination, with a bar, of a bolt passing diagonally through the end of said bar and having its inner end anchored in the rear portion of said bar, and a clevis mounted on said bar and having a hook formed thereon that is secured to the outer end of said bolt at the end of said bar.

5. The combination, with a bar, of a strap fitting the rear edge thereof, a clevis mounted on the end of said bar and having a backwardly turned hook portion, a bolt passing through said hook and diagonally through the end of said bar and having its inner end inwardly turned and passing through said strap and anchored in the rear edge of said bar.

In witness whereof, I have hereunto set my hand this 16th day of April 1913.

WILLIAM H. CROSSLEY.

Witnesses:
  GEORGE THIESSEN,
  FINIS BENTLEY.

---

Copies of this patent may be obtained for five cents each, by addressing the "Commissioner of Patents, Washington, D. C."